March 8, 1938.  H. F. FLOWERS  2,110,214
TRUCK CONSTRUCTION FOR VEHICLES
Original Filed April 18, 1934  3 Sheets-Sheet 3
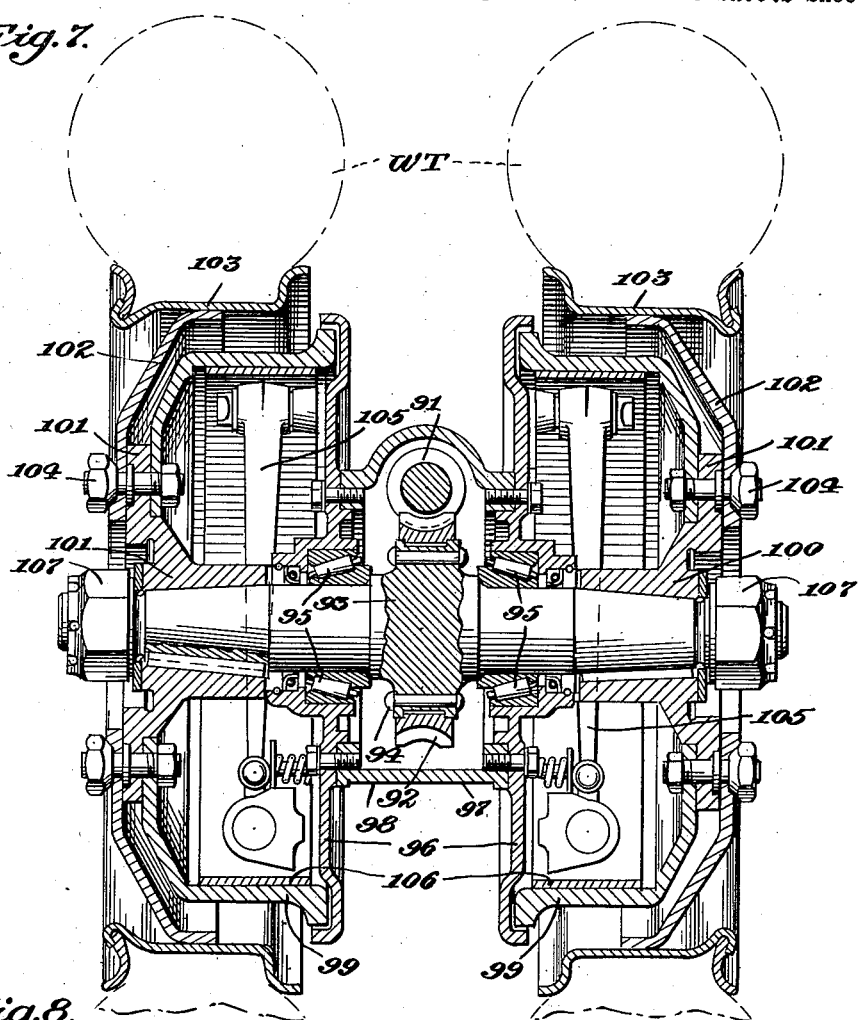
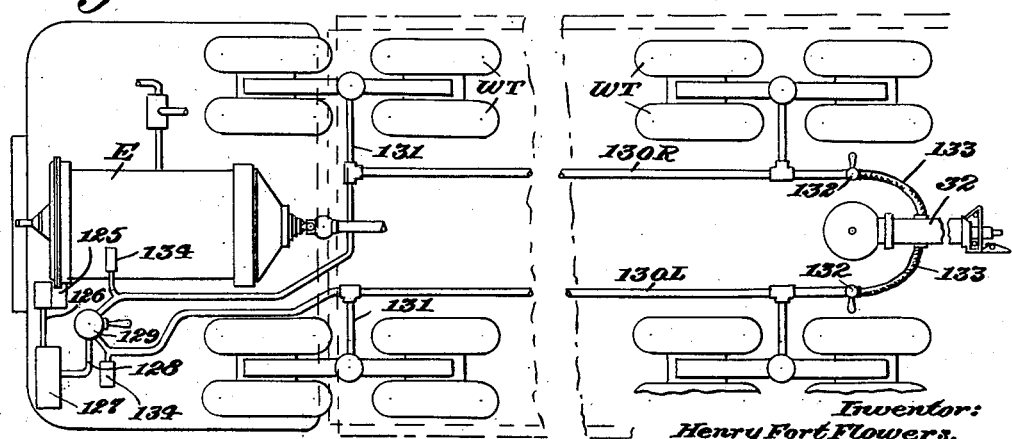
Inventor:
Henry Ford Flowers,
by
Attys.

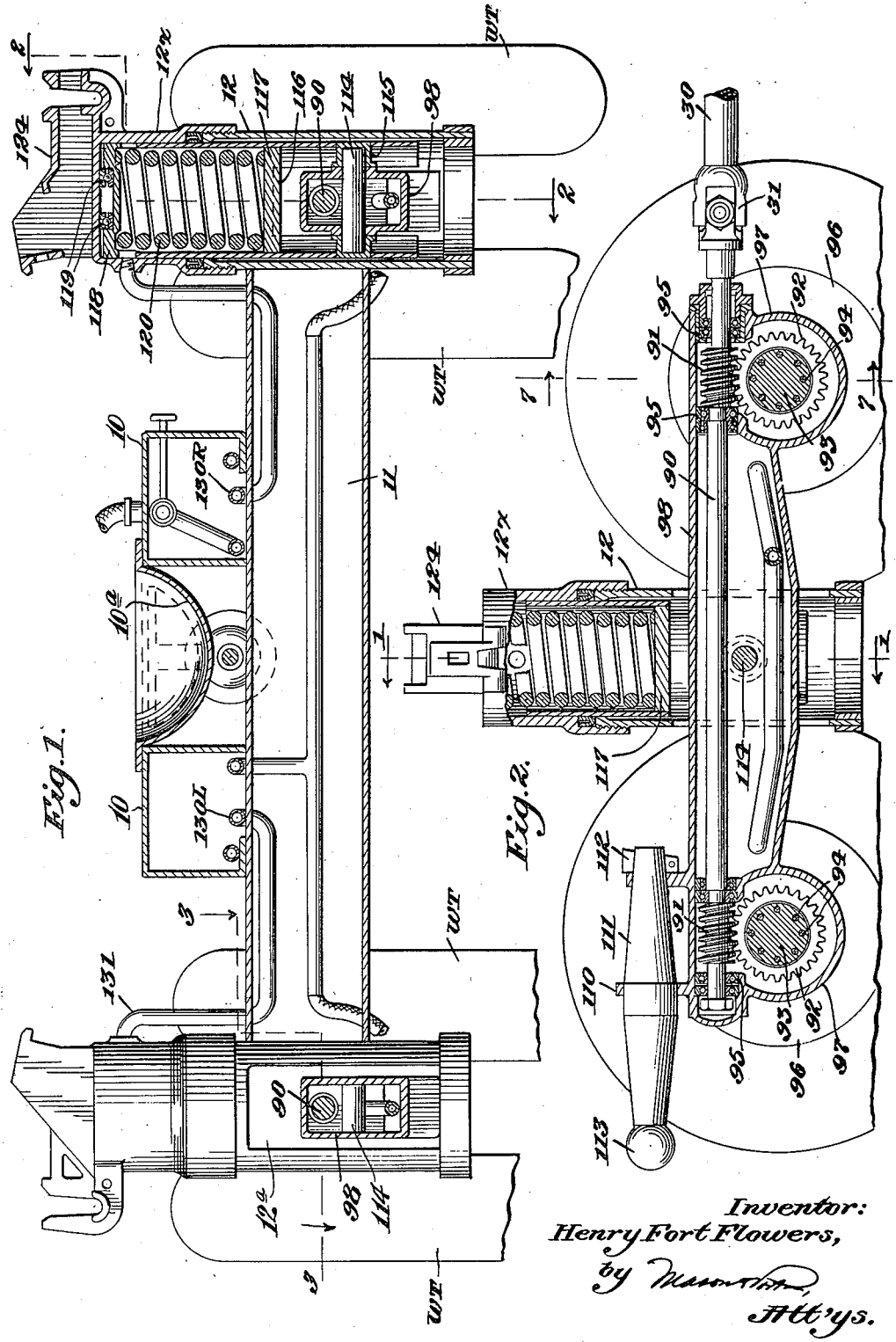

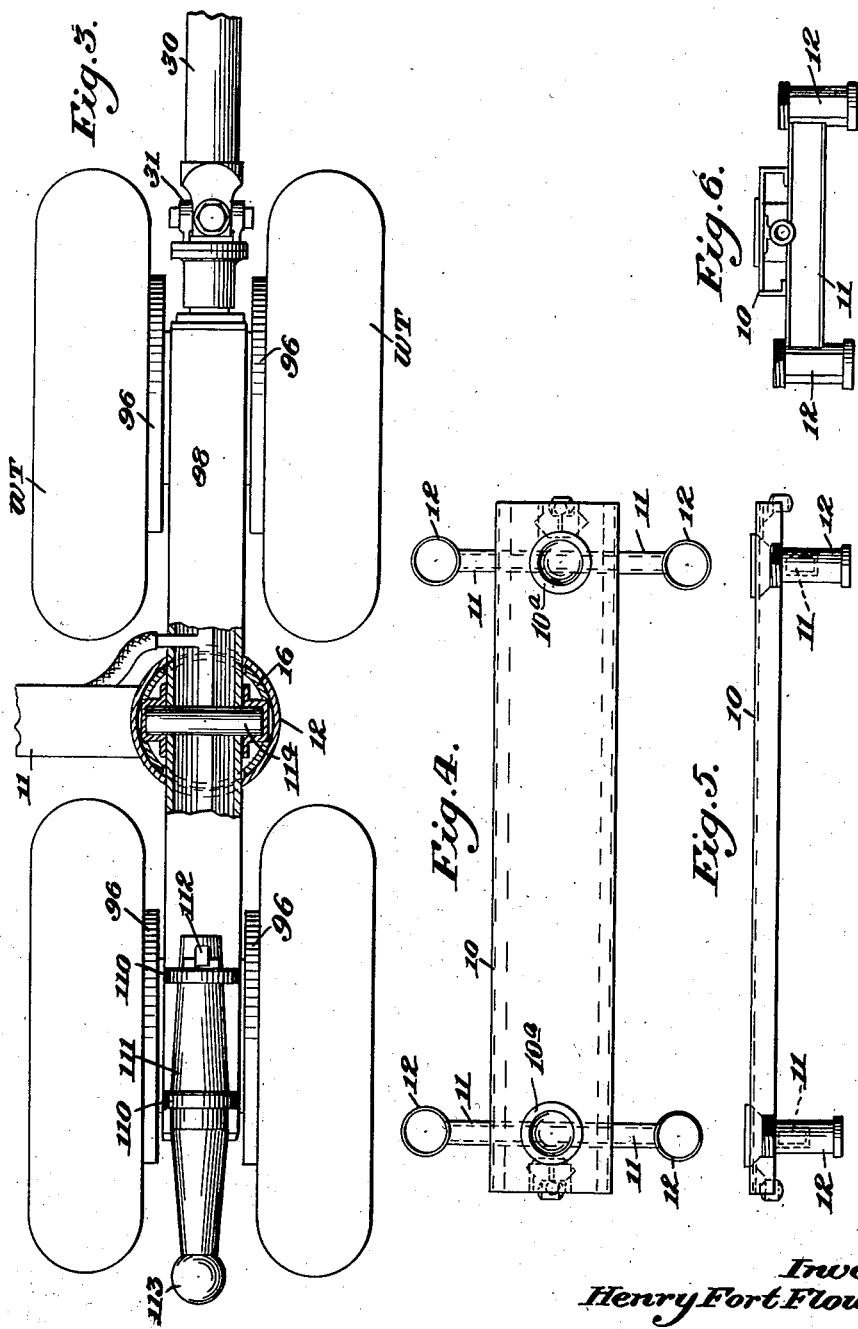

Patented Mar. 8, 1938

2,110,214

UNITED STATES PATENT OFFICE 2,110,214

TRUCK CONSTRUCTION FOR VEHICLES

Henry Fort Flowers, Findlay, Ohio

Original application April 18, 1934, Serial No. 721,234. Divided and this application October 12, 1935, Serial No. 44,777

11 Claims. (Cl. 280—124)

This invention relates to a truck construction for vehicles, and is a division of my copending application Serial No. 721,234, filed April 18, 1934.

One of the features of the present invention is the provision of a truck system for vehicles in which pairs of trucks are provided, with the trucks of each pair located opposite one another at sides of the vehicle frame, each truck having a plurality of spaced axles and wheels so mounted and arranged that the wheels may adjust themselves to the unevennesses of ground or rails over which they are moving, together with a common cushioning means between the general vehicle frame and the pluralities of wheels on a single truck.

Another feature of the present invention is the provision of such a truck arrangement in which the truck is substantially free to rock about an axis transverse to the direction of movement, this axis being resiliently mounted with respect to the general vehicle frame.

Still another feature of the present invention is the provision of such a truck system in which cushioning and resilient mounting structures are included in an assemblage including a plurality of pairs of such trucks, the mountings and the yielding of the individual trucks permitting the vehicle to traverse an uneven terrain.

Still another feature of the invention is the provision of independent, resilient and cushioning mountings for the trucks, together with means for controlling the resistances opposed to vertical movements of the trucks at one or both sides of the vehicle or vehicles, and more specifically further including means for establishing differing relationships of the trucks with respect to the rest of the vehicle or vehicles whereby the vehicle body or bodies may be leveled.

Fig. 1 is a transverse sectional view through the vehicle frame and a pair of truck assemblies, in an upright plane substantially on line 1—1 of Fig. 2.

Fig. 2 is a longitudinal upright sectional view substantially on line 2—2 of Fig. 1.

Fig. 3 is a horizontal sectional view substantially on line 3—3 of Fig. 1.

Fig. 4 is a plan view, on a smaller scale, of a vehicle frame utilized with two pairs of such truck assemblage.

Fig. 5 is a side elevation of the same.

Fig. 6 is an end view of the same.

Fig. 7 is a transverse sectional view substantially on line 7—7 of Fig. 2, on a larger scale.

Fig. 8 is a diagrammatic horizontal plan view showing the air connection for the cushioning cylinders.

In the present illustrated embodiment of the invention, the vehicle includes a main frame having a center sill or beam 10 extending longitudinally of the vehicle, and cross frames 11, 11 at each end thereof. This center sill and the cross frames are preferably built up from metal plates so as to provide hollow structures. Rigidly attached to each end of each cross frame is a cylinder 12. Mounted on each cylinder is a truck assembly. This truck assembly, in general, consists of a piston member 116 fitting within the cylinder and mounted for oscillation about the longitudinal axis of the cylinder and also vertical movement relative to the cylinder. Attached to this piston member is a truck frame 98. Said truck frame is pivoted to the piston member and oscillates therewith in the cylinder. It is also so connected to the piston as to permit free relative vertical movement between the piston and the cylinder. This truck frame is a rigid frame structure and carries at each end thereof a spindle 93. The spindles, as shown, project laterally from both sides of the truck frame. There is a wheel WT mounted at each end of each spindle, so that the truck assembly has four wheels. As illustrated, these wheels are of a character for road travel, although it will be understood that they may be otherwise constructed. The spindle carries a worm wheel 92 and mounted on the truck frame is a shaft 90 carrying gears 91 meshing with the worm wheel for rotating the same. The piston preferably has a fluidtight connection with the cylinder and disposed within the piston and the cap 12x at the upper end of the cylinder is a coiled spring 120 which serves as a cushioning member for supporting the main frame on the trucks. There are pipes 131 leading from a source of fluid supply under pressure to the cylinder above the piston so that the chamber between the piston and the upper end of the cylinder can be put under fluid pressure for assisting and producing a resilient mounting for the main frame and body on the truck assemblies. This fluid supply is controlled by valves 132 and can be utilized for adjusting the height of the vehicle frame at corresponding sides of the vehicle with respect to the terrain being traversed, whether such terrain be a road, open ground or a rail. The body is mounted on the caps 124 at the upper end of the cylinder so that the other parts of the main frame are not subjected to heavy strains and are not called upon to operate as beams in transferring loads in horizontal directions. In other words, the body weight is transmitted directly to the trucks and wheels, and the light frame is sufficient for a body of large carrying capacity. The wheels, furthermore, are so spaced and separated by employing four at each corner of the vehicle, that the load on each wheel may be substantially equalized with respect to all others. This distribution of the load on the spaced wheels reduces the tendency of any wheel or pair of wheels to sink into mud or break through the surface of the road, as the total ground area covered is large and this area is not locally strained to an excessive degree.

Telescoping power shafts 30 are connected as shown in Figs. 2 and 3 through the universal joints 31 to the shafts 90 located each within an individual truck frame, and supported by anti-friction bearings and provided with appropriate seals against the escape of lubricant therealong. Each shaft 90 is provided with two worms 91 which are individually in mesh with the worm wheels 92 in the truck. As shown in Fig. 7, it is preferred to provide axle members 93 each having tapered ends to receive the corresponding two wheels at each end of the truck. Each worm 92 may be constructed separately from the axle, and secured thereto by clamping rings and rivets 94. Each axle is supported at either side of the worm wheel 92 by anti-friction bearings 95 which are carried by plates 96 constituting closure members for open-sided portions 97 at the ends of the main body 98 of the truck frame (Fig. 7), and at the same time forming dirt closures for the brake drums 99 of the corresponding wheels. Each axle end or spindle receives a sleeve 100 provided with an outwardly extending bolting flange 101 to which the brake drum 99 is secured, and to which may be secured the disk 102 forming a portion of the removable tire-supporting structure which includes the rims 103. The nuts 104 cooperate with securing bolts to permit the individual removal of the tires. Supported on the plates 96 are also provided the brake arms 105 preferably operated in suitable manner from the air brake lines described hereinafter, to apply the brake bands 106 against the interior of the brake drums. The axle nuts 107 hold the assemblies upon the axles.

The main truck frame 98 is preferably hollow. The end of the frame of one of the forward trucks is provided with an upstanding bracket 110 (see Fig. 2). A pin 111 extends through this bracket and through a lug carried by the truck frame and is secured therein by a key 112. This pin is provided with a ball 113 at its outer end for cooperation with a steering link.

Each of the truck bodies is provided with a horizontal shaft 114 on which the truck may rock while its wheels are conforming to unevenness in the terrain. The shaft 114 of each truck is supported by bearing members 115 fixed on the downwardly extending portions of the piston structure 116 which is guided inside the walls of the cushion cylinder 12, which in turn is provided with a cap 12x having at its top a casting structure 124 upon which the body may rest, and with respect to which the body may turn during dumping. On the main frame 10 is a cup-shaped seat 10a for the usual hoisting mechanism used for tilting the body. The piston structure 116 has a closing plate 117 so that it operates in conjunction with the closed upper end of the cap 12x and the general cylinder 12, as a variable volume fluid-actuated cushioning structure for controlling the relative position of the truck frame 98 with respect to the body. The upper end of the cavity in cap 12x receives a rotatable bearing plate 118 which may swivel upon the bearings 119, and operates as the upper abutment for the lading spring 120 of the corresponding truck, the lower end of the spring 120 abutting against the plate 117. The upper end of the cylinder rests on the plate 118 which is supported by the spring 120 and the spring is supported by the plate 117, thus the piston becomes the main frame supporting member. The size of the spring 120 is preferably so selected that while the vehicle is traveling empty, the springs alone are sufficient to afford the proper resilient support to the body, but that when loads are placed upon the body, air may be selectively admitted into the several cylinder and piston arrangements, for example through the conduit 131 for the cylinder shown at the right in Fig. 1, to establish an air cushion to assist the corresponding spring. The front and rear faces of the cushion cylinders 12 are cut away 12a (see Fig. 1) to permit freedom of the corresponding truck frame 98 for upward and downward movement relative to the cylinder 12, and also for rocking movement about the axis established by the corresponding shaft 114, and the rocking movement for steering about the vertical axis of the cylinder itself.

The supply of air to the cylinders is preferably effected from an air pump 125 driven from the engine E (Fig. 8), the air being passed through a pipe 126 to a storage tank 127 and thence by a pipe 128 to the cushion control valve 129 by which it may be admitted selectively to the right-hand cushioning air pipe 130R and/or to the left-hand cushioning air pipe 130L, which pass along the length of the tractor vehicle and have branches 131 to the several air cushioning devices. At the rear of the tractor vehicle the pipes 130R and 130L are provided with shut-off valves 132 and the flexible connections 133 to the extensions located in the coupling tube 32 of the corresponding vehicle. The trailer vehicles correspondingly have flexible connections 133 to the shut-off valves 132 and the pipes 130 on such vehicle. It is preferred to employ independent gauges 134 to indicate to the driver the pressures prevailing within the right-hand and left-hand cushioning pipes 130R and 130L (Fig. 8).

Each truck frame 98 is thus capable of upward and downward movements relative to its cushioning cylinder 12 and also of rocking movements about the axis 114. Furthermore, the frame 98 and axis 114 may turn together about the vertical axis of the cylinder, the skirt and piston structure 116 then turning within the walls of the cushioning cylinder 12 and its cap 12x, while the spring 120 is free to move by reason of the bearing 119, without the creation of a torsion effect in this spring.

The main frame, as above stated, includes a center beam 10 which is hollow, and as illustrated is in the form of an open modified channel. This channel receives and protects the pipe lines 130L, 130R for the cushions, the pipe lines for braking service, ducking service, etc.: and the main power drive may likewise be protected thereby (see Fig. 1).

Pistons are arranged for movement in the cylinders, and are supported with respect to the cylinders by springs and air cushions. Each of the pistons supports a pivot for a truck frame. Each truck frame is provided with axle members extending laterally in at least one direction from the truck body for supporting the wheels.

It is obvious that the invention may be employed in many ways, other than that illustrated, without departing from the scope of the appended claims.

I claim:

1. A vehicle including a main frame, opposed vertically extending members rigidly connected to said frame at opposite sides thereof, a truck associated with each of said members, each truck including a rigid frame, a spindle at each end of said rigid frame, said spindle extending through said frame and projecting laterally from both sides thereof, a wheel mounted on each spindle at each side of said frame, a shaft disposed within said rigid frame and geared to said spindles for rotating the same, a main frame supporting member mounted on the vertically extending member so as to turn about a vertical axis and have a vertical movement relative thereto, said main frame supporting member being guided in its vertical movements and in its turning movements by said vertically extending member, said truck frame being mounted on said main frame supporting member so as to turn and move vertically therewith and so as to rock in a vertical plane thereon, and means for cushioning the relative vertical movement of said frame supporting member and said vertically extending member.

2. A vehicle including a main frame, opposed vertically extending cylinders rigidly connected to said frame at opposite sides thereof, a truck associated with each of said cylinders, each truck including a rigid frame, a laterally projecting wheel supporting member at each end of said frame, a wheel mounted on each supporting member, a piston mounted in said cylinder so as to turn about the vertical axis of the cylinder and have a vertical movement relative to said cylinder said piston being guided in its vertical and turning movements by said cylinder, and a coiled spring located within said cylinder between said piston and the upper end of said cylinder for cushioning the relative movements of the cylinder and the piston, said truck frame being mounted on said piston so as to turn and move vertically therewith and so as to rock in a vertical plane thereon.

3. A vehicle including a main frame, opposed vertically extending cylinders rigidly connected to said frame at opposite sides thereof, a truck associated with each of said cylinders, each truck including a rigid frame, a laterally projecting wheel supporting member at each end of said frame, a wheel mounted on each supporting member, a piston mounted in said cylinder so as to turn about the vertical axis of the cylinder and having a vertical movement relative to said cylinder said piston being guided in its vertical and turning movements by said cylinder, a coiled spring located within said cylinder between said piston and the upper end of said cylinder for cushioning the relative movements of the cylinder and the piston, said truck frame being mounted on said piston so as to turn and move vertically therewith and so as to rock in a vertical plane thereon, each piston having a fluidtight connection with the cylinder with which it is associated, and means for supplying fluid pressure under control to the cylinder whereby a fluid pressure may be created between the piston and the cylinder head for assisting in cushioning the relative movements between the cylinder and the piston.

4. A vehicle including a main frame, opposed vertically extending cylinders rigidly connected to said frame at opposite sides thereof, a truck associated with each of said cylinders, each truck including a rigid frame, a laterally projecting wheel supporting member at each end of said frame, a wheel mounted on each supporting member, a piston mounted in each cylinder, a thrust plate mounted for rotation about a vertical axis at the upper end of said cylinder, a coiled spring bearing at its upper end against said thrust plate and at its lower end against said piston, said truck frame being mounted on said piston so as to turn and move vertically therewith and so as to rock in a vertical plane thereon.

5. A vehicle including a main frame, opposed vertically extending cylinders rigidly connected to said frame at opposite sides thereof, a truck associated with each of said cylinders, each truck including a rigid frame, a laterally projecting wheel supporting member at each end of said frame, a wheel mounted on each supporting member, a piston mounted in each cylinder, a thrust plate mounted for rotation about a vertical axis at the upper end of said cylinder, a coiled spring bearing at its upper end against said thrust plate and at its lower end against said piston, said truck frame being mounted on said piston so as to turn and move vertically therewith and so as to rock in a vertical plane thereon, each piston having a fluid-tight connection with the cylinder with which it is associated, and means for supplying fluid pressure under control to the cylinder whereby a fluid pressure may be created between the piston and the cylinder head for assisting in cushioning the relative movements between the cylinder and the piston.

6. A vehicle including a main frame, opposed vertically extending cylinders rigidly connected to said frame at opposite sides thereof, a truck associated with each of said cylinders, each truck including a rigid frame, a laterally projecting wheel supporting member at each end of said frame, a wheel mounted on each supporting member, each cylinder having a depending extension provided with slots therein through which said truck member extends, a piston mounted in said cylinder, a pivot shaft carried thereby on which said truck frame is mounted so as to rock in a vertical plane, said piston being free to turn and to move vertically relative to said cylinder, and a spring disposed between the piston and the upper end of said cylinder and serving as a cushioning means for supporting the main frame.

7. A vehicle including a main frame, opposed vertically extending cylinders rigidly connected to said frame at opposite sides thereof, a truck associated with each of said cylinders, each truck including a rigid frame, a laterally projecting wheel supporting member at each end of said frame, a wheel mounted on each supporting member, a piston mounted in each cylinder, a thrust plate mounted for rotation about a vertical axis at the upper end of said cylinder, a coiled spring bearing at its upper end against said thrust plate and at its lower end against said piston, said truck frame being mounted on said piston so as to turn and move vertically therewith and so as to rock in a vertical plane thereon, each piston having a fluid-tight connection with the cylinder with which it is associated, means for supplying fluid pressure under control to the cylinder whereby a fluid pressure may be created between the piston and the cylinder head for assisting in cushioning the relative movements between the cylinder and the piston, and means carried by the upper end of each cylinder on which the body may be supported.

8. A vehicle comprising a frame, a hollow vertically extending member rigidly connected to said frame at one side thereof, said hollow member being closed at its upper end, a body supporting member having telescoping connection with said vertically extending member and closing the lower end thereof so as to form a closed chamber within said vertically extending member, a cushioning spring located in said chamber for cushioning the vertical movements of the body supporting member relative to the frame, said body supporting member being mounted so as to turn about the axis of said vertically extending member, a truck frame, wheels mounted thereon in tandem, and means whereby said body supporting member is mounted on the truck frame intermediate the ends thereof so that the truck frame may oscillate about a horizontal axis in a vertical plane.

9. A vehicle comprising a main frame, opposed vertically extending members rigidly connected to said frame at opposite sides thereof, a truck associated with each of said members, each truck including a rigid frame, a wheel mounting at each end of said rigid frame, a road wheel carried by each mounting, a main frame supporting member carried by said rigid truck frame and mounted on said vertically extending member so as to turn about a vertical axis and have a vertical movement relative thereto, said truck frame being mounted on said main frame supporting member so as to turn and move vertically therewith and so as to rock in a vertical plane thereon, means for cushioning the relative movement of said frame supporting member and said vertically extending member, and a steering means connected to said rigid truck member for turning the body supporting member about a vertical axis for guiding the vehicle.

10. A vehicle comprising a main frame, opposed vertically extending members rigidly connected to said frame at opposite sides thereof, a truck associated with each of said members, each truck including a rigid frame, a wheel mounting at each end of said rigid frame, a road wheel carried by each mounting, a main frame supporting member carried by said rigid truck frame and mounted on said vertically extending member so as to turn about a vertical axis and have a vertical movement relative thereto, said truck frame being mounted on said main frame supporting member so as to turn and move vertically therewith and so as to rock in a vertical plane thereon, means for cushioning the relative movement of said frame supporting member and said vertically extending member, each wheel mounting including a driving spindle, a driving means carried by the rigid truck frame for actuating said spindles, and a driving member having a universal connection with said driving means whereby said truck frame is permitted to move vertically, oscillate about a horizontal axis and turn about a vertical axis.

11. A vehicle comprising a main frame, opposed vertically extending members rigidly connected to said frame at opposite sides thereof, a truck associated with each of said members, each truck including a rigid frame, a wheel mounting at each end of said rigid frame, a road wheel carried by each mounting, a main frame supporting member carried by said rigid truck frame and mounted on said vertically extending member so as to turn about a vertical axis and have a vertical movement relative thereto, said truck frame being mounted on said main frame supporting member so as to turn and move vertically therewith and so as to rock in a vertical plane thereon, means for cushioning the relative movement of said frame supporting member and said vertically extending member, each wheel mounting including a driving spindle, a driving means carried by the rigid truck frame for actuating said spindles, a driving member having a universal connection with said driving means whereby said truck frame is permitted to move vertically, oscillate about a horizontal axis and turn about a vertical axis, and a steering means connected to said rigid truck member for turning the body supporting member about a vertical axis for guiding the vehicle.

HENRY FORT FLOWERS.